US011793130B1

(12) United States Patent
Buhler et al.

(10) Patent No.: US 11,793,130 B1
(45) Date of Patent: Oct. 24, 2023

(54) ELECTROSPRAYER SPACE WATERING SYSTEM

(71) Applicant: United States of America as Represented by the Administrator of NASA, Washington, DC (US)

(72) Inventors: Charles R. Buhler, Merritt Island, FL (US); Jerry J. Wang, Melbourne, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 240 days.

(21) Appl. No.: 17/523,522

(22) Filed: Nov. 10, 2021

Related U.S. Application Data

(60) Provisional application No. 63/113,480, filed on Nov. 13, 2020.

(51) Int. Cl.
*A01G 29/00* (2006.01)
*B05B 5/16* (2006.01)
*B05B 5/10* (2006.01)
*B05B 5/08* (2006.01)
*A01G 31/02* (2006.01)

(52) U.S. Cl.
CPC ............. *A01G 29/00* (2013.01); *A01G 31/02* (2013.01); *B05B 5/087* (2013.01); *B05B 5/10* (2013.01); *B05B 5/16* (2013.01)

(58) Field of Classification Search
CPC ........ A01G 29/00; A01G 31/00; B05B 5/087; B05B 5/10; B05B 5/16
See application file for complete search history.

(56) References Cited

U.S. PATENT DOCUMENTS

| | | | | |
|---|---|---|---|---|
| 4,004,733 | A | 1/1977 | Law | |
| 4,168,327 | A | 9/1979 | Law | |
| 4,514,930 | A | 5/1985 | Schorr et al. | |
| 4,685,620 | A | 8/1987 | Law et al. | |
| 5,121,884 | A * | 6/1992 | Noakes ................. | B05B 5/0531 239/708 |
| 5,704,554 | A | 1/1998 | Cooper et al. | |

(Continued)

OTHER PUBLICATIONS

Anderson, Molly S., et al. "Key gaps for enabling plant growth in future missions." AIAA SPACE and Astronautics Forum and Exposition. 2017.

(Continued)

*Primary Examiner* — Richard G Davis
(74) *Attorney, Agent, or Firm* — Jonathan Leahy; Mark Homer; Trenton Roche

(57) ABSTRACT

The subject invention is an electrostatic plant watering system for the delivery of water and nutrients to the roots of plants. The system provides water or another fluid from a fluid source or container using a pump. The pump provides a pressurized fluid at a constant flow rate through a nozzle at a low pressure, which sprays a fine mist of particles through a conductive metallic ring that is electrically charged by a voltage source. As the fluid particles pass through the center of the electrically charged ring, the particles themselves become charged, allowing them to attach to the roots of a target plant positioned at a selected distance away from the electrostatic plant watering system.

18 Claims, 4 Drawing Sheets

(56) References Cited

U.S. PATENT DOCUMENTS

| | | | | |
|---|---|---|---|---|
| 5,765,761 | A * | 6/1998 | Law | B05B 5/043 239/700 |
| 5,975,425 | A | 11/1999 | Carlton | |
| 6,193,988 | B1 | 2/2001 | Stoner et al. | |
| 7,788,113 | B2 | 8/2010 | Fuhrman et al. | |
| 8,533,992 | B2 | 9/2013 | Harwood | |
| 8,782,948 | B2 | 7/2014 | Harwood | |
| 8,985,051 | B2 | 3/2015 | Crawford | |

OTHER PUBLICATIONS

Appah, Samuel, et al. "Review of electrostatic system parameters, charged droplets characteristics and substrate impact behavior from pesticides spraying." International Journal of Agricultural and Biological Engineering 12.2 (2019): 1-9.
Barak, P., J.D. Smith, A.R. Krueger, and L.A. Peterson, "Measurement of short-term nutrient uptake rates in cranberry by aeroponics." Plant, Cell & Environment 19.2 (1996): 237-242.
Bowen, H.D. Electric and inertial forces in pesticide application, Unpublished Ph.D. dissertation, Department of Agricultural Engineering, Michigan State University, East Lansing, MI, 1953.
Bowen, H. D., W. E. Splinter, and W. M. Carleton. "Theoretical implications of electrical fields on deposition of charged particles." Transactions of the ASAE 7.1 (1964): 75-0082.
Briggs, B. A. "An experiment in air-rooting." International Plant Propagators' Society, 1966.
Carlton, J. B. "Electrical capacitance determination and some implications for an electrostatic spray-charging aircraft." Transactions of the ASAE 18.4 (1975): 641-0644.
Clawson, J. M., et al. "NASA-Review of aeroponics, aeroponics for spaceflight plant growth." Soci of Auto Eng. http://aeroponicsdiy.com/nasa-review-of-aeroponics (2000).
Cooper, Steven C., and S. Edward Law. "Bipolar spray charging for leaf-tip corona reduction by space-charge control." IEEE transactions on industry applications 2 (1987): 217-223.
Zabel, Paul, et al. "Review and analysis of over 40 years of space plant growth systems." Life Sciences in Space Research 10 (2016): 1-16.
Dreschel, T.W, and J. Sager. "Control of water and nutrients using a porous tube—A method for growing plants in space." HortScience 24.6 (1989): 944-947.
Dreschel, T.W, C.W. Carlson, H.W. Wells, K.F. Anderson, W.M. Knott, W. Munsey, "Physical Testing for the Microgravity Plant Nutrient Experiment". Proceedings, ASAE/CSAE, Jun. 1993, ASAE—paper 93-4007 (1993).
Dreschel, T. W., et al. "Porous tube plant nutrient delivery system development: a device for nutrient delivery in microgravity." Advances in Space Research 14.11 (1994): 47-51.
Giles, D.K. and S.E. Law, "Space charge deposition of pesticide sprays onto cylindrical target arrays", Transactions of the ASAE 28 (3) (1985) 658-664.
Giles, D. K., and S. E. Law. "Dielectric boundary effects on electrostatic crop spraying." Transactions of the ASAE 33.1 (1990): 2-0007.
Giles, D. K., Y. Dai, and S. E. Law. "Enhancement of spray electrodeposition by active precharging of a dielectric boundary." Proceedings of the 8th International Conference on Electrostatics 1991. Publ by Inst of Physics Publ Ltd, 1991.
Hoehn, Alex, et al. Microgravity root zone hydration systems. No. 2000-01-2510. SAE Technical Paper, 2000.
Stoner, R.J. "Progressive Plant Growing Has Business Blooming", Environmental and Agricultural Resources, NASA Spinoff 2006 (2006).
Inculet, I. I., G.S.P. Castle, D.R. Menzies, R. Frank, "Deposition studies with a novel form of electrostatic crop sprayer." Journal of Electrostatics 10 (1981): 65-72.
Jones, Scott B., and Dani Or. "Microgravity effects on water flow and distribution in unsaturated porous media: Analyses of flight experiments." Water resources research 35.4 (1999): 929-942.
Jones, Scott B., et al. "Beyond Earth: Designing root zone environments for reduced gravity conditions." Vadose Zone Journal 11.1 (2012):doi:10.2136/vzj2011.0081.
Klotz, L. G. A. "A simplified method of growing plants with roots in nutrient vapors." Phytopathology 34 (1944): 507-508.
Lane, Michael D., and S. Edward Law. "Transient charge transfer in living plants undergoing electrostatic spraying." Transactions of the ASAE 25.5 (1982): 1148-1153.
Law, S. Edward, and Michael D. Lane. "Electrostatic deposition of pesticide sprays onto ionizing targets: charge-and mass-transfer analysis." IEEE transactions on Industry Applications 6 (1982): 673-679.
Law, S. Edward, J. Robert Cooke, and Steven C. Cooper. "Space charge suppression of electrostatic-induction spray charging." Journal of electrostatics 40 (1997): 603-608.
Law, S. Edward. "Agricultural electrostatic spray application: a review of significant research and development during the 20th century." Journal of Electrostatics 51 (2001): 25-42.
Law, S. Edward. "Embedded-electrode electrostatic-induction spray-charging nozzle: theoretical and engineering design." Transactions of the ASAE 21.6 (1978): 1096-1104.
Law, S. Edward. "Electrostatic pesticide spraying: concepts and practice." IEEE transactions on Industry Applications 2 (1983): 160-168.
Law, S. Edward, and Adrian G. Bailey. "Perturbations of charged-droplet trajectories caused by induced target corona: LDA analysis." IEEE transactions on industry applications 6 (1984): 1613-1622.
Law, S. E., and H. D. Bowen. "Effects of liquid conductivity upon gaseous discharge of droplets." IEEE Transactions on Industry Applications 25.6 (1989): 1073-1080.
Law, S. E., and S. C. Cooper. "Target grounding requirements for electrostatic deposition of pesticide sprays." Transactions of the ASAE 32.4 (1989): 1169-1172.
Zhao, Shaoxing, GS Peter Castle, and Kazimierz Adamiak. "Comparison of conduction and induction charging in liquid spraying." Journal of Electrostatics 63.6-10 (2005a): 871-876.
Mamidi, Venkata Reddy, et al. "Electrostatic hand pressure knapsack spray system with enhanced performance for small scale farms." Journal of Electrostatics 71.4 (2013): 785-790.
Martin, Daniel E., and Mohamed A. Latheef. "Efficacy of electrostatically charged glyphosate on ryegrass." Journal of Electrostatics 90 (2017a): 45-53.
Martin, Daniel E., and Mohamed A. Latheef. "Aerial electrostatic spray deposition and canopy penetration in cotton." Journal of Electrostatics 90 (2017b): 38-44.
Martin, Daniel E., Mohamed A. Latheef, and Juan D. López Jr. "Electrostatically charged aerial application improved spinosad deposition on early season cotton." Journal of Electrostatics 97 (2019): 121-125.
Maski, Devanand, and Divaker Durairaj. "Effects of electrode voltage, liquid flow rate, and liquid properties on spray chargeability of an air-assisted electrostatic-induction spray-charging system." Journal of Electrostatics 68.2 (2010): 152-158.
Massa, Gioia D., et al. "Growth chambers on the International Space Station for large plants." VIII International Symposium on Light in Horticulture 1134. 2016.
Massa, Gioia D., N. F. Dufour, J. A. Carver, M. E. Hummerick, R. M. Wheeler, R. C. Morrow, T. M. Smith, "VEG-01: Veggie hardware validation testing on the International Space Station." Open Agriculture 2.1 (2017): 33-41.
Monje, O., G. Stutte, and D. Chapman. "Microgravity does not alter plant stand gas exchange of wheat at moderate light levels and saturating CO 2 concentration." Planta 222.2 (2005): 336-345.
Morrow, R. C., et al. "The ASTROCULTURE™-1 flight experiment: Pressure control of the WCSAR porous tube nutrient delivery system." SAE Transactions (1993): 1582-1587.
Morrow, R. C., et al. "Plant response in the ASTROCULTURE flight experiment." Society of Automotive Engineers Technical Paper 951624 (1995).
Morrow, R. C., and T. M. Crabb. "Biomass production system (BPS) plant growth unit." Advances in Space Research 26.2 (2000): 289-298.

(56) References Cited

OTHER PUBLICATIONS

Patel, Manoj Kumar, C. Ghanshyam, and Pawan Kapur. “Characterization of electrode material for electrostatic spray charging: Theoretical and engineering practices.” Journal of Electrostatics 71.1 (2013): 55-60.
Wampler, E. L., and W. M. Hoskins. “Factors Concerned in the Deposit of Sprays: VI. The Role of Electrical Charges Produced During Spraying.” Journal of Economic Entomology 32.1 (1939): 61-69.
Porterfield, D. M., et al. “Spaceflight hardware for conducting plant growth experiments in space: the early years 1960-2000.” Advances in Space research 31.1 (2003): 183-193.
Soffer, Hillel, and David W. Burger. “Effects of dissolved oxygen concentrations in aerohydroponics on the formation and growth of adventitious roots.” Journal of the American Society for Horticultural Science 113.2 (1988): 218-221.
Steinberg, Susan L., Doug W. Ming, and Don Henninger. “Plant production systems for microgravity: Critical issues in water, air, and solute transport through unsaturated porous media.” NASA/TM-2002-210774 (2002).
Steinberg, Susan L., and Darwin Poritz. “Measurement of hydraulic characteristics of porous media used to grow plants in microgravity.” Soil Science Society of America Journal 69.2 (2005): 301-310.
Zhao, S., G. S. P. Castle, and K. Adamiak. “The effect of space charge on the performance of an electrostatic induction charging spray nozzle.” Journal of Electrostatics 63.3-4 (2005b): 261-272.
Clawson, J., Hoehn, A., Stodieck, L., Todd, P. et al., “Re-examining Aeroponics for Spaceflight Plant Growth,” SAE Technical Paper 2000-01-2507, 2000, https://doi.org/10.4271/2000-01-2507.
Malissa, Joel, et al. “Electrospraying for Aeroponics.” Electrostatic Society of America Annual Meeting, Rochester, New York (2019).

* cited by examiner

ELECTROSPRAYER SPACE WATERING SYSTEM

CROSS REFERENCE TO RELATED APPLICATIONS

This application claims the benefit of priority under 35 U.S.C. § 119(e) from U.S. Provisional Patent Application Ser. No. 63/113,480 filed on Nov. 13, 2020, the contents of which are incorporated herein by reference.

ORIGIN OF THE INVENTION

The invention described herein was made by employees of the United States Government and may be manufactured and used by or for the Government of the United States of America for governmental purposes without payment of any royalties thereon or therefor.

FIELD OF THE INVENTION

The present invention relates generally to electrosprayer systems for the delivery of water and nutrients to plants and more specifically to electrosprayer systems for the delivery of water and nutrients to plants in space.

DESCRIPTION OF THE RELATED ART

There is a growing need for increased spray deposition efficiency of liquids at close proximity to target surfaces. Whether it's disinfectant of a surface from bacteria or viruses such as COVID-19, application of herbicide to plants, or delivery of chemicals for sterilization of food or produce; it is highly undesirable to allow for waste of the costly product being used, as well as, a waste of water as the delivery media. In many cases, the volume of use of such systems may be highly constrained. For example, a primary challenge to growing plants in space is the delivery of adequate water and nutrients to a plant's roots in microgravity. Current hydroponic nutrient delivery techniques proposed for space involve the use of a medium for the roots to penetrate, such as Arcilite, and power is typically required to actively pump water to the roots. When water is actively pumped to the roots, the user must carefully calibrate the amount of water and nutrients being pumped in order to prevent over- or under-watering that could inhibit plant growth. The current watering technique on the International Space Station using the Vegetable Production System (Veggie) frequently requires astronauts to manually pump water into the pillows with a syringe to sustain the plants.

One alternative would be the use of electrostatic spraying, or electrospraying to provide a more consistent and efficient delivery of water and nutrients to the roots of plants. Electrostatic spraying is a well-known technique that allows for the precise spray control of liquids and powders for a variety of industrial and agricultural processes. The control of liquid aerosols, as well as, fine particulates via electrostatics is particularly valuable and commonly used for the control of particulate trajectories for dispersion, propulsion, attraction, deposition, patternization, agglomeration, conveyance and separation, to name a few. Electrospray techniques are commonly used for powder coating vehicles, furniture, sun tanning, drug delivery for inhalers, and other commercial markets where waste needs to be minimized. The agricultural industry has been using electrospray technology for almost 80 years for pesticide delivery and control on plants and trees. Electrospray can help deliver pesticides to the underneath part of the leaves and stems where insects lay, as opposed to uncharged gravitational or air-driven sprays that deposit only on the tops of canopies. This technology area is called agricultural electrostatics.

In general, fluid particles (also described as fluid droplets or atomized fluids) acquire their charge as they flow downstream from a liquid nozzle. Upon exit from the nozzle, the fluid particles pass through an electric field generated by an induction electrode or other charging element that has a voltage applied to it. The charged fluid particles then attach to a predetermined target (e.g., the roots of a plant). Although the example target here is for use with plants, the target can be doors, windows, food products, or any complicated structure that requires an even coating of the prescribed treatment chemical at close range with little overspray or loss of additive. While electrostatic spraying to deliver water and nutrients to plants is well-known, the prior art has significant drawbacks related to its ability to be used in small volumes such as those required in space. First, many electrostatic spraying systems, such as the one disclosed in U.S. Pat. No. 8,985,051 ("Apparatus for Producing a Spray of Changed Droplets of Aqueous Liquid," Crawford) require significant air pressure or hydraulic pressure to atomize fluids prior to charging. While this is not a significant limitation on Earth for spraying large tracks of fields, having pressurized gasses or fluids in highly controlled small enclosures such as the International Space Station is a significant drawback. In addition, while power sources are readily available on Earth, power supplies are scarce in space. As such, it is preferable to develop systems that do not require significant power to operate so that the limited power supplies available can be used for more critical life support and propulsion systems Eliminating the need to pressurize gasses or fluids in order to atomize them would reduce the overall power consumption of a system as well. In addition, eliminating the need to pressurize the system reduces mass, which is important when launching and using equipment in small controlled areas in space.

Second, many electrostatic spraying systems use unshielded charging elements to charge the fluid particles as they are being sprayed. If fluid were to come into contact with these charging elements, it could create an electrical short in the system. These designs typically rely on either a more complex nozzle, which includes generating a gaseous slipstream around the atomized fluid to prevent the fluid from coming into contact with the charging element (U.S. Pat. No. 4,004,733) or through the use of a large enough charging element so that the fluid particles aren't at risk of coming into contact with the charging element (U.S. Pat. No. 5,765,761). In these cases, not only does the system have to operate perfectly in order to eliminate the risk of an electrical short, but the exposed charging element can also create a safety hazard in controlled space environments.

Finally, many of the state-of-the-art electrostatic spraying systems in use are for large commercial agricultural applications. More specifically, the system is air-assisted and intended to spray water and nutrients on plants up to 25 feet away or from an airplane. These systems are not well-suited to using small amounts of water or nutrients fluids, can't easily be operated in tightly enclosed spaces, and are poorly suited to microgreens and other plants being evaluated for cultivation in space. They are not suited for sterilization of surfaces at close range as needed for food production or surface preparation.

Due to the aforementioned limitations in the prior art, limited power generation capabilities in space, and size and safety limitations of space-based agricultural systems, a new, safer design was needed that could provide for adequate hydration of plants or sterilization of surfaces with a reduced size and mass profile and lower power consumption requirements.

SUMMARY OF THE INVENTION

The subject invention is an electrostatic plant watering system for the delivery of water and nutrients to the roots of plants. The system provides water or another fluid from a fluid source or container using a pump. The pump provides a pressurized fluid at a constant flow rate through a nozzle at a low pressure, which sprays a fine mist of particles through a conductive metallic ring that is electrically charged by a voltage source. As the fluid particles pass through the center of the electrically charged ring, the particles themselves become charged, allowing them to attach to the roots of a target plant positioned at a selected distance away from the electrostatic plant watering system.

Specifically, the system comprises a reservoir connected to a pump with a pressurizing end and an output end that provides a pressurized fluid at a constant flow rate.

The output end of the pump connects to the connecting end of a nozzle. The nozzle also has an outer surface and an output surface that atomizes the pressurized fluid into a fine mist of fluid particles. The interior surface of an electrically insulating housing is secured to at least a portion of the outer surface of the nozzle.

The inner surface of an electrode ring housing is then secured to an exterior surface of the electrically insulating housing in a manner such that the electrode ring housing extends past the nozzle. A conductive metallic ring is embedded in the bottom surface of the electrode ring housing, and it is positioned so that the fine mist of fluid particles passes through the conductive metallic ring. When voltage is applied to the conductive metallic ring by a voltage source connected to the ring via a lead wire through a lead port in the electrode ring housing, the fine mist of fluid particles becomes electrostatically charged as it flows past the conductive metallic ring. The now electrostatically charged mist of fluid particles attaches to roots of a target plant positioned at a selected distance away from the electrostatic plant watering system.

To address the problems associated with the related art for use in space, the electrostatic plant watering system was specifically designed to operate in a very small or confined space. Specifically, the system was designed to spray water or nutrient solutions on the roots of plants a few inches away (typically between 4 and 12 inches). To address the safety and power constraints in space, the system was designed to pump water or nutrient solutions at very low pressures (without using pressurized air or hydraulic pressurization) with a limited power supply. Finally, due to limited access to replacement parts, many of the parts of the system were designed so that they could be durable while in constant contact with water or other fluids, yet they could be 3D printed as needed should one of the parts ever break. This is incredibly important for use on the International Space Station or in long-duration spaceflight, as access to replacement parts may take weeks or months.

DETAILED DESCRIPTION OF THE INVENTION

Figure 1A:
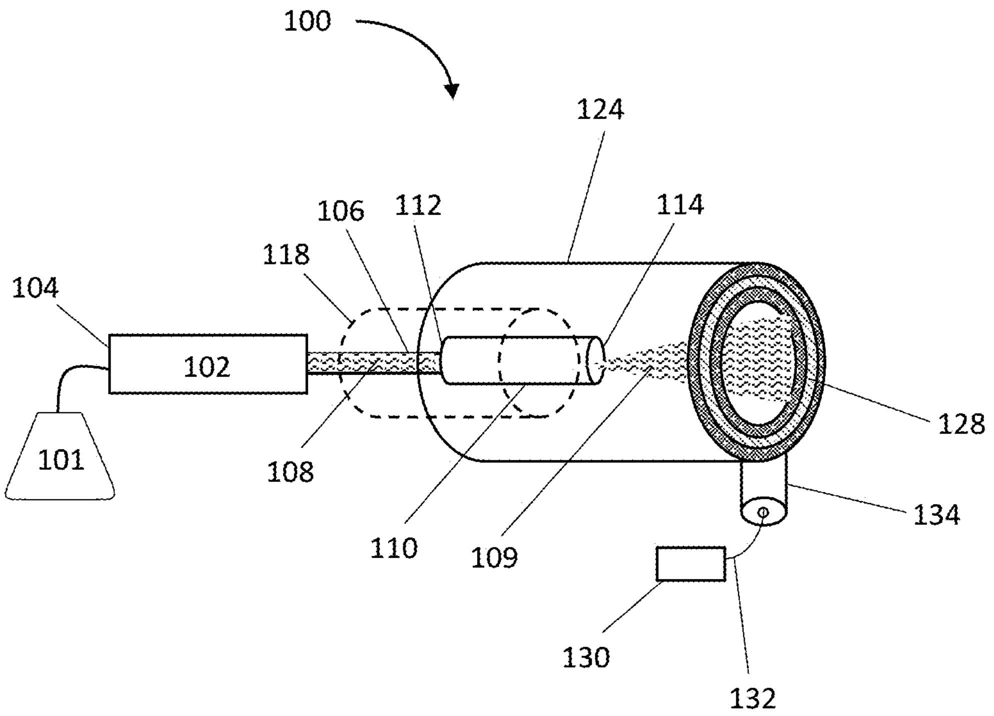
FIG. 1*a* depicts an embodiment of the present invention.

Referring to FIGS. 1*a*, 1*b*, 1*c*, and 1*d*, the present invention is an electrostatic plant watering system 100 for the delivery of water and nutrients to plants. The electrostatic plant watering system 100 comprises a fluid source 101 connected to a pump 102 with a pressurizing end 104 and an output end 106 that can provide a pressurized fluid 108 at a constant flow rate through a nozzle 110. Suitable fluid sources 101 can be a hose, vessel, reservoir, tank, or any other source or container known to one of skill in the art. Suitable materials for the fluid source 101 can be rubber, plastic, metal, fiber composite, or any other material known to one of skill in the art for storing or conveying fluids. In a preferred embodiment, the fluid source 101 is a plastic container. A suitable pump 102 can be a syringe pump, cyclic pump, pressurized fluid tank, or any other pump known to one of skill in the art that can provide a pressurized fluid 108 at a constant flow rate. In a preferred embodiment, the pump 102 is a syringe pump. The fluid source 101 and the pump 102 can be connected by any connection method or mechanism known to one of skill in the art.

A connecting end 112 of the nozzle 110 fastens to the output end 106 of the pump 102, and an output surface 114 of the nozzle 110 that atomizes the pressurized fluid into a fine mist of fluid particles 109. In a preferred embodiment, the pressurized fluid 108 is pressurized to a pressure between two bar and ten bar, and the pump 102 provides the pressurized fluid 108 at a constant flow rate between 35 mL/min and 360 mL/min. In addition, the particle size of the fine mist of fluid particles 109 can be anywhere between 20 to 100 microns. For the purposes of the present invention, "fine mist" is defined by the flow rates and sizes above. Suitable pressurized fluids 108 include water, hydroponic nutrient solutions (which in one embodiment would include a mixture of water and plant nutrients customized for the plant species being grown), Hoagland's solution, fertilizers, pesticides, and similar fluids known to one of ordinary skill in the art. In a preferred embodiment, the pressurized fluid 108 is water. In another preferred embodiment, the pressurized fluid 108 is a hydroponic nutrient solution. The fluid 108, 109 used can be customized for agricultural uses, but it can also potentially be adapted for other industrial uses by one of ordinary skill in the art.

At least a portion of the outer surface of the nozzle 110 is secured to the interior surface 116 of an electrically insulating housing 118. The electrically insulating housing 118 can be made from any electrically insulating material, such as plastic (including Delrin, Teflon, Ultem, polylactic acid (PLA), and Polyether ether ketone (PEEK), among others), porcelain, fiber composites, rubber, and other similar electrically insulating materials known to one of ordinary skill in the art.

The exterior surface 120 of the electrically insulating housing 118 is secured to the inner surface 122 of an electrode ring housing 124 so that a portion of the electrode ring housing 124 extends past the nozzle 110. The electrode ring housing 124 can be made from any electrically insulating material, such as plastic (including Delrin, Teflon, Ultem, polylactic acid (PLA), and Polyether ether ketone (PEEK), among others), porcelain, fiber composites, rubber, and other similar electrically insulating materials known to one of ordinary skill in the art. In a preferred embodiment, both the electrically insulating housing 118 and the electrode ring housing 124 are constructed from a durable plastic that can be 3D printed. This not only allows the housings 118, 124 to be durable while in contact with the fluid 108, 109, but it also allows astronauts to quickly 3D print replacement housings 118, 124 should they fail.

A conductive metallic ring 126 is embedded in the bottom surface 128 of the electrode ring housing 124, positioned so that the fine mist of fluid particles 109 passes through the conductive metallic ring 126. The electrode ring housing 124 extends past the output surface 114 of the nozzle 110 to provide sufficient distance between the output surface 114 and the ring 126 so that the ring 126 can ionize substantially all of the fine mist 109. In a preferred embodiment, the diameter of the ring 126 is larger than the diameter of the output surface 114 of the nozzle 110. Also in a preferred embodiment, the conductive metal ring 126 is embedded in the electrode ring housing 124 so that it is positioned 0 millimeters to 10 millimeters away from the output surface 114 of the nozzle 110.

The conductive metallic ring 126 can be made from any electrically conductive metal, such as copper, aluminum, gold, silver, steel, brass, and other similar electrically conductive metals known to one of ordinary skill in the art. In a preferred embodiment, the conductive metallic ring 126 is made from copper.

In one embodiment, a portion of the conductive metallic ring 126 is covered by a ring cover 128. The ring cover 128 can be an insert or other material that covers any exposed surface of conductive metallic ring 126. The ring cover 128 can be made from any electrically insulative material, such as plastic, epoxy, rubber, or any other electrical insulator known to one of ordinary skill in the art. The ring cover 128 protects the conductive metallic ring 126 and prevents fluid particles from coming into contact with the conductive metallic ring 126, which could cause an electrical short.

A voltage source 130 is connected to the conductive metallic ring 126 via a lead wire 132 through a lead port 134 through the electrode ring housing 124. The voltage source 130 can be any source known to one of ordinary skill in the art, and the voltage may be selected by one skilled in the art to provide sufficient charge to the ring 126 to ionize the fine mist of fluid particles 109. In a preferred embodiment, the voltage applied is 1 kV to 10 kV.

The fine mist of fluid particles 109 becomes electrostatically charged as it flows past the conductive metallic ring 126 when voltage is applied. This allows the now electrically charged fine mist of fluid particles 109 to attach to a primary target 136 (e.g., the roots of a plant) positioned at a selected distance away from the electrostatic plant watering system 100. While the system 100 can be adapted by one of skill in the art to spray the primary target 136 at varying distances, in a preferred embodiment, the distance between the primary target 136 and the system 100 is four inches to twelve inches.

In situations where the primary target 136 (e.g., the roots of the target plant) of the electrostatic spraying system 100 is electrically conductive but cannot be easily grounded, a secondary target 138, or an artificial target, that is grounded is beneficial. The primary target 136 can be placed inside of the secondary target 138, or the secondary target 138 can be placed behind the primary target 136. The secondary target 138 can be made from any electrically conductive material, such as copper, aluminum, gold, silver, steel, brass, conductive fabrics, conductive foams, and other similar electrically conductive metals known to one of ordinary skill in the art. In a preferred embodiment, the secondary target 138 is made from brass. In another preferred embodiment, the secondary target 138 is made from steel. In addition, the secondary target 138 can be an orb or sphere, a flat plate, a sheet of fabric, a cube, or any other shape selected by one of skill in the art to allow for the charged fluid particles 109 to attach to the primary target 136. In a preferred embodiment, the secondary target 138 is a sphere. Since the secondary target 138 would need to be grounded, it may be connected to a ground by a wire, shaft, plate, or other ground connection known to one of skill in the art.

If the primary target 136 is not electrically conductive (e.g., lunar regolith), one of skill in the art would need to pre-charge the primary target 136 to the opposite polarity of the fine mist of fluid particles 109 to attract the charged fluid particles 109. In situations where the target of the electrostatic spraying system 100 is electrically conductive and the target can be easily grounded, an artificial target 138 is not required.

The present system 100 generally provides a pressurized fluid 108 from a fluid source 101 using a pump 102. The pump 102 provides a pressurized fluid 108 at a constant flow rate through a nozzle 110 at a low pressure, which sprays a fine mist of particles 109 through a conductive metallic ring 126 that is electrically charged by a voltage source 130. As the fluid particles 109 pass through the center of the electrically charged ring 126, the particles 109 themselves become charged, allowing them to attach to a primary target 136 positioned at a selected distance away from the electrostatic plant watering system 100.

Figure 1B:
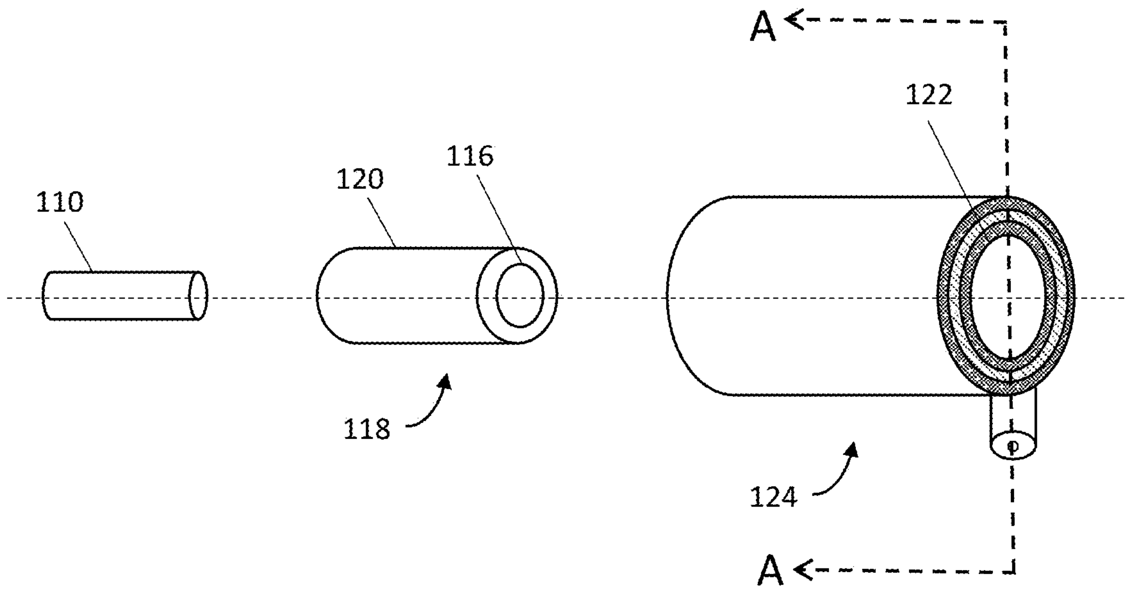
FIG. 1B depicts an exploded view of a subsystem of an embodiment of the present invention.

FIG. 1B shows an exploded view of a subsection of the system 100. Specifically, the figure highlights the nozzle 110, the electrically insulating housing 118, and the electrode ring housing 124.

Figure 1C:
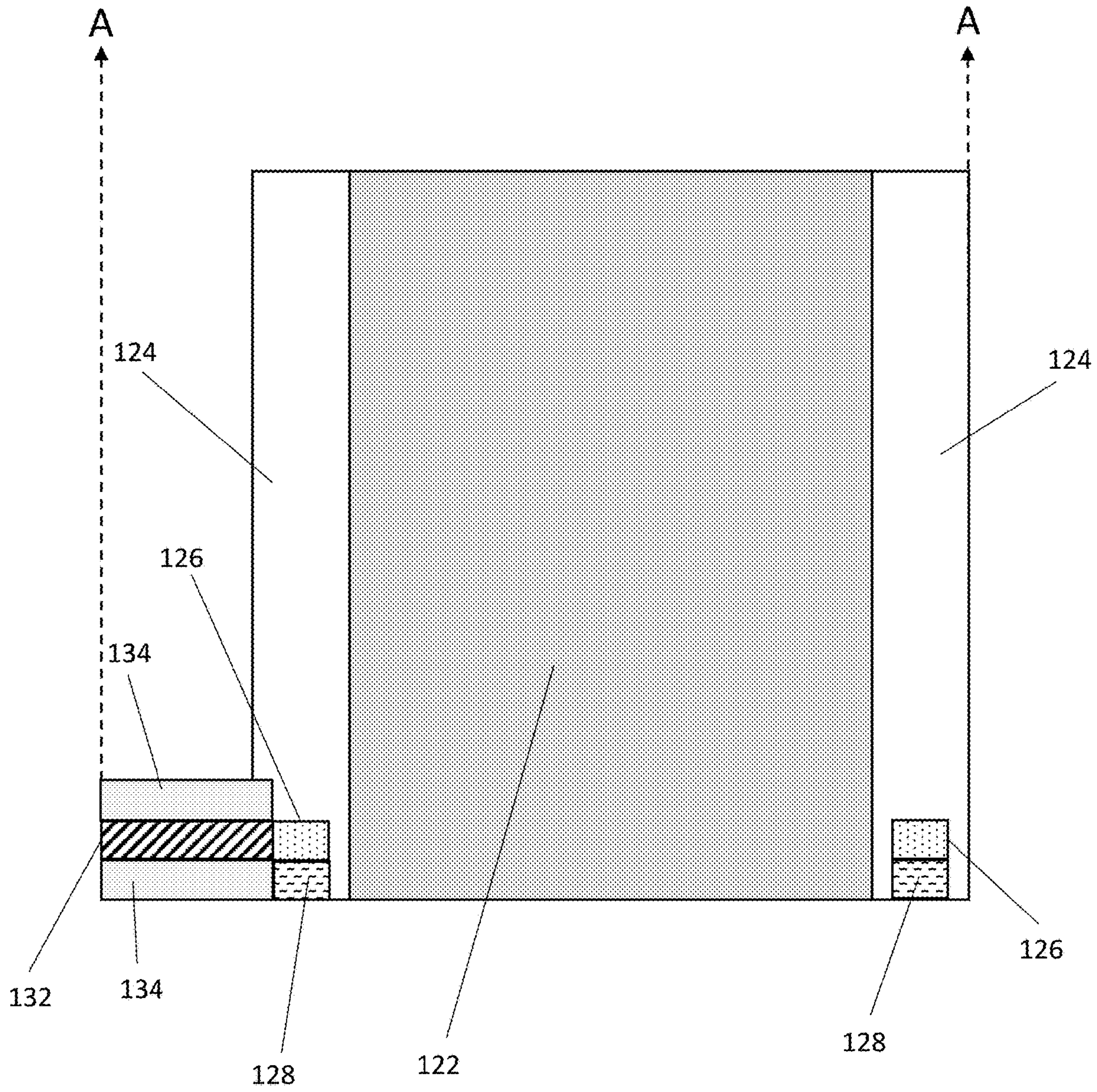
FIG. 1*c* depicts a cross-section of the electrode ring housing, cut along line A-A, of an embodiment of the present invention.

FIG. 1*c* shows a cross-section of ring housing 124 along line A-A to highlight the relationship of the ring housing 124, the conductive metallic ring 126, the ring cover 128, the lead wire, and the lead port 134.

Figure 1D:
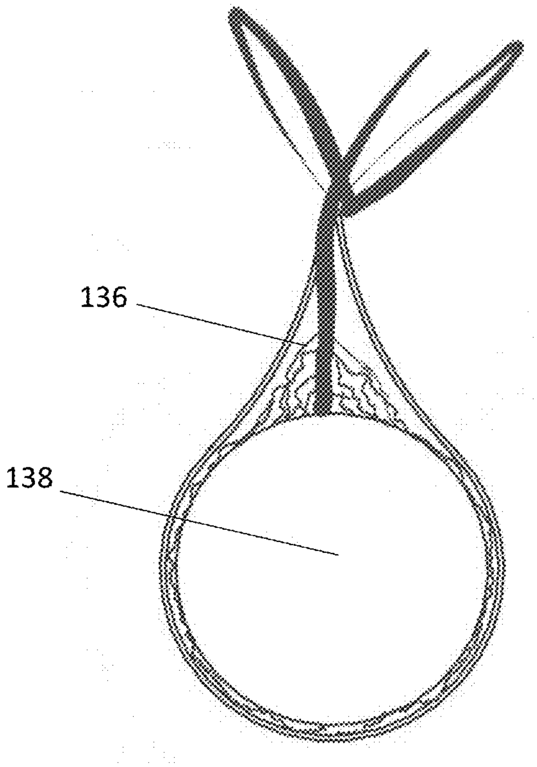
FIG. 1*d* depicts an embodiment of the primary target and secondary target of the present invention

FIG. 1*d* shows the primary target 136 that would be positioned at a distance away from the system 100 and the secondary target 138 proximate to the primary target 136.

In a method for using the preferred embodiment of the electrostatic plant watering system described above, in the first step, the user provides an electrostatic plant watering system comprising a fluid source, a fluid, a pump, a nozzle, an electrically insulating housing, an electrode ring housing, a conductive metallic ring, an electrical power source, a lead wire, and a primary target. In another embodiment of this method, the user provides a plant watering system that also comprises a secondary target.

In another embodiment of this method, the electrostatic plant watering system is used in microgravity, which for the purposes of this application is an environment without gravity or any environment with lower gravitational force than on Earth. Such microgravity environments include in space; on spacecraft; on the surface of an extraterrestrial body such as asteroids, the moon, other planets and their surrounding moons; and any other such environments known to one of skill in the art.

In the second step, the user adds a fluid to the fluid source. Suitable fluids include water, hydroponic nutrient solutions (which in one embodiment would include a mixture of water and plant nutrients customized for the plant species being grown), Hoagland's solution, fertilizers, pesticides, and similar fluids known to one of ordinary skill in the art. In a preferred embodiment, the fluid is water. In another preferred embodiment, the fluid is a hydroponic nutrient solution. The fluid used can be customized for agricultural uses, but it can also potentially be adapted for other industrial uses by one of ordinary skill in the art.

In the third step, the user supplies an electrical power source to the system that provides an electrical charge to the conductive metallic ring via the lead wire. The power source also provides power to the pump (if required to operate the pump selected) and supplies the voltage source to the conductive metallic ring via the lead wire. The electrical power source can be an electrical plug, battery, or any other source know to one of ordinary skill in the art.

In the fourth step, the user selects a distance between the system and the primary target. While the system can be adapted by one of skill in the art to spray the primary target at varying distances, in a preferred embodiment, the distance between the primary target and the system is four inches to twelve inches.

In the final step, the user activates the pump to supply a pressurized fluid to the nozzle to atomize the fluid into a fine mist of fluid particles. As the fluid particles pass through the electrically charged conductive metallic ring, the particles become electrically charged. The now electrically charged particles are attracted to the primary target, and their electrical charge allows the particles to attach to the primary target. The pump can be turned on or activated using any activation method known to one of skill in the art, such as a switch or button.

In another embodiment of the method of using the plant watering system, an additional step can be added between the third step and the fourth step when the primary target provided is electrically conductive but not electrically grounded, the user places a electrically conductive secondary target that is electrically grounded below or proximate to the primary target.

The shapes and sizes of the elements of the present invention described above can be selected by one of skill in the art that will allow the selected fluid to flow and charge properly. Preferably, the elements and ring are circular and cylindrically shaped to promote constant and controllable flow of fluid.

What is described herein are specific examples of many possible variations on the same invention and are not intended in a limiting sense. The claimed invention can be practiced using other variations not specifically described above.

We claim:

1. An electrostatic plant watering system comprising:
- a fluid source connected to a pump with a pressurizing end and an output end that provides a pressurized fluid at a constant flow rate;
- a nozzle with a connecting end that fastens to the output end of the pump, an outer surface, and an output surface that atomizes the pressurized fluid into a fine mist of fluid particles;
- an electrically insulating housing with an interior surface that is secured to at least a portion of the outer surface of the of the nozzle and an exterior surface;
- an electrode ring housing with an inner surface that is secured to the exterior surface of the electrically insulating housing and extends past the nozzle;
- a conductive metallic ring embedded in the bottom surface of the electrode ring housing positioned so that the fine mist passes through the metallic ring; and
- a voltage source connected to the metallic ring connected via a lead wire through a lead port through the electrode ring housing, wherein the fine mist of fluid particles becomes electrostatically charged as it flows past the conductive metallic ring when voltage is applied allowing the fine mist of fluid particles to attach to a primary target positioned at a selected distance away from the electrostatic plant watering system.

2. The electrostatic plant watering system of claim 1, wherein the pump is a syringe pump.

3. The electrostatic plant watering system of claim 1, wherein the pressurized fluid comprises a fluid pressurized between 35 mL/min and 360 mL/min.

4. The electrostatic plant watering system of claim 1, wherein the pressurized fluid comprises water, a nutrient solution, a fertilizer, or a pesticide.

5. The electrostatic plant watering system of claim 1, wherein the constant flow rate comprises a rate between 35 mL/min and 360 mL/min.

6. The electrostatic plant watering system of claim 1, wherein the electrically insulating housing comprises plastic, porcelain, a fiber composite, or rubber.

7. The electrostatic plant watering system of claim 1, wherein the electrode ring housing comprises plastic, porcelain, a fiber composite, or rubber.

8. The electrostatic plant watering system of claim 1, wherein the conductive metal ring comprises copper, aluminum, gold, silver, steel, or brass.

9. The electrostatic plant watering system of claim 1, wherein the conductive metal ring is positioned between 0 millimeters and 10 millimeters from the output surface of the nozzle.

10. The electrostatic plant watering system of claim 1, wherein the diameter of the conductive metal ring is greater than the diameter of the output surface.

11. The electrostatic plant watering system of claim 1, wherein the conductive metal ring is covered by a material comprising plastic, epoxy, or rubber.

12. The electrostatic plant watering system of claim 1, wherein the voltage source applies a voltage from about 1 kV to about 10 kV to the metallic ring.

13. The electrostatic plant watering system of claim 1, wherein the primary target comprises the roots of a plant.

14. The electrostatic watering system of claim 1, wherein the primary target is positioned between four inches and twelve inches away from the electrode ring housing.

15. The electrostatic plant watering system of claim 1, wherein an electrically conductive secondary target is placed behind the primary target.

16. The electrostatic plant watering system of claim 15, wherein the electrically conductive secondary target is a metal orb.

17. An electrosprayer system comprising:
- a fluid source connected to a pump with a pressurizing end and an output end that provides a pressurized fluid at a constant flow rate;
- a nozzle with a connecting end that fastens to the output end of the pump, an outer surface, and a output surface that atomizes the pressurized fluid into a fine mist of fluid particles;
- an electrically insulating housing with an interior surface that is secured to at least a portion of the outer surface of the of the nozzle and an exterior surface;
- an electrode ring housing with an inner surface that is secured to the exterior surface of the electrically insulating housing and extends past the nozzle;
- a conductive metallic ring embedded in the bottom surface of the electrode ring housing positioned so that the fine mist passes through the metallic ring; and a voltage source connected to the metallic ring connected via a lead wire through a lead port through the electrode ring housing, wherein the fine mist of fluid particles becomes electrostatically charged as it flows past the conductive metallic ring when voltage is applied allowing the fine mist of fluid particles to attach to a primary target positioned at a selected distance away from the electrostatic plant watering system.

18. A method of using the electrostatic plant watering system in microgravity, comprising the steps of:

providing an electrostatic plant watering system comprising a fluid source, a fluid, a pump, a nozzle, an electrically insulating housing, an electrode ring housing, a conductive metallic ring, an electrical power source, a lead wire, and a primary target;

adding the fluid to the fluid source;

supplying an electrical power source to the system, wherein the electrical power source provides an electrical charge to the conductive metallic ring via the lead wire;

selecting a distance between the electrostatic plant watering system and the primary target; and activating the pump to pressurize the fluid and supply the pressurized fluid to the nozzle, wherein the nozzle atomizes the fluid into a fine mist of particles before the particles pass through the conductive metallic ring, thereby electrically charging the fluid particles so that they attach to the primary target.

* * * * *